United States Patent

Strolle

[15] 3,644,260
[45] Feb. 22, 1972

[54] COATING COMPOSITIONS CONTAINING FLUOROCARBON POLYMER AND ALKYL SILICATE

[72] Inventor: Clifford Hugh Strolle, Springfield, Pa.

[73] Assignee: E. I. du Pont de Nemours and Company, Wilmington, Del.

[22] Filed: Nov. 3, 1969

[21] Appl. No.: 873,624

[52] U.S. Cl..............................260/29.6 F, 117/72, 117/75, 260/32.8 F, 260/33.2 R, 260/33.4 F
[51] Int. Cl......................................C08f 45/24, C08f 45/34
[58] Field of Search.....................260/33.4 F, 33.6 F, 33.2 R, 260/33.8 F, 29.6 F, 32.8 R; 106/287 SE

[56] References Cited

UNITED STATES PATENTS

| | | | |
|---|---|---|---|
| 2,946,763 | 7/1960 | Bro | 260/900 |
| 3,429,845 | 2/1969 | Bechtold | 260/33.4 F |
| 3,429,846 | 2/1969 | Bechtold | 260/29.6 F |
| 3,476,827 | 11/1969 | Engelhardt | 260/33.2 |
| 3,514,425 | 5/1970 | Engelhardt | 260/33.8 F |

FOREIGN PATENTS OR APPLICATIONS 1,064,840   4/1967   Great Britain

*Primary Examiner*—Morris Liebman
*Assistant Examiner*—P. R. Michl
*Attorney*—John E. Griffiths

[57] ABSTRACT

A composition for priming a surface to improve adhesion of a fluorocarbon polymer topcoat. The composition contains an alkyl silicate, a particulate fluorocarbon polymer and a liquid carrier.

6 Claims, No Drawings

3,644,260

COATING COMPOSITIONS CONTAINING FLUOROCARBON POLYMER AND ALKYL SILICATE

BACKGROUND OF THE INVENTION

This invention relates to coating compositions. It is more particularly directed to primer compositions for improving the adhesion of fluorocarbon polymer coatings to their substrates.

In recent years, use of fluorocarbon polymers as lubricous coatings has become widespread. Cookware coated with polytetrafluoroethylene has become especially popular because of its nonstick character.

Due to the physical nature of these fluorocarbon polymers it is difficult to bond them to suitable substrates. This is especially true of polytetrafluoroethylene.

SUMMARY OF THE INVENTION

This invention comprises a primer composition consisting of (1) particulate fluorocarbon polymer, (2) alkyl silicate, and (3) liquid carrier. This primer composition is used to prime the substrate before the fluorocarbon polymer topcoat is applied.

The fluorocarbon polymers are known polymers. They include hydrocarbon monomers completely substituted with fluorine atoms or a combination of fluorine atoms and chlorine atoms. Included in this group are polytetrafluoroethylene, copolymers of tetrafluoroethylene and hexafluoropropylene in all monomer unit ratios, and fluorochlorocarbon polymers such as polymonochlorotrifluoroethylene. Polytetrafluoroethylene is preferred.

The preferred alkyl silicates are ones having up to five carbon atoms per alkyl group, such as, methyl orthosilicate, ethyl orthosilicate, propyl orthosilicate and amyl orthosilicate, including partially and completely hydrolyzed alkyl silicates, and mixtures thereof. It should be understood that the hydrolyzed alkyl silicates could have more than 20 carbon atoms per compound, but they are the hydrolyzed product of the original alkyl silicates having up to five carbon atoms per alkyl group.

The liquid carrier may be water or an organic liquid. Especially preferred are organic liquids as illustrated in Examples 1 and 2.

The alkyl orthosilicate ordinarily present in the composition constitutes about 10 percent through 70 percent by weight of the total alkyl orthosilicate and fluorocarbon polymer solids preferably from about 15 percent through 35 percent.

The liquid carrier ordinarily present in the composition constitutes about 30 percent through 70 percent by weight of the total composition and preferably from about 40 percent through 60 percent.

Suitable fluorocarbon polymers when dispersed in an aqueous dispersion are described in Bro and Sandt, U.S. Pat. No. 2,946,763 issued July 26, 1960. The entire disclosure of the Bro and Sandt patent is incorporated herein by reference.

Suitable fluorocarbon polymers when dispersed in organic liquids are described in British Pat. Specification No. 1,064,840 published Apr. 12, 1967. The entire disclosure of this specification is also incorporated herein by reference.

The composition is made by mixing proper amounts of a suitable alkyl silicate and a fluorocarbon polymer dispersion.

The resulting primer composition can be applied by spraying, brushing, dipping, or roller coating. If the surface to be coated is metal, it is preferably pretreated by grit blasting, by the flame spraying of metals or metal oxides, or by frit coating the substrate after application, the primer coat is air dried and then baked at 200°–250° C. for 10 to 20 minutes.

This primer coat is then topcoated with a conventional clear or pigmented fluorocarbon polymer enamel, and baked in the usual way, to give an adherent fluoropolymer coating.

The composition is most useful for priming metal or glass cookware for coating with polytetrafluoroethylene. This primer can also be used to prime many similar type articles for coating with polytetrafluoroethylene. Polytetrafluoroethylene sheeting that has been primed with this material can be bonded to other materials such as metals, plastics or glass.

As a specific example of the composition of this invention the following illustrative examples are given. In these examples all parts are by weight.

EXAMPLE 1

A primer composition may be prepared by thoroughly mixing:

| | |
|---|---|
| Ethyl silicate (available as Union Carbide's ethyl silicate 40, a partially hydrolyzed ethyl silicate containing predominantly pentamers of the silicate), in a mixture of isopropanol and cellulose (62% solids) | 100 parts |
| Polytetrafluoroethylene organosol, methyl isobutyl ketone, (48% solids) | 250 parts |

A sheet of aluminum is cleaned. The sheet is then sprayed with the primer composition to a thickness of 0.2 to 0.4 mils (dry).

The sheet is then baked for 20 minutes at 200° C. after which it is coated with a topcoat of an aqueous dispersion of polytetrafluoroethylene with the following composition:

| | |
|---|---|
| Polytetrafluoroethylene aqueous dispersion (50% solids) | 99.5 parts |
| Sodium salt of the sulfuric acid ester of a mixture of long chain alcohols (predominantly lauryl alcohol) | 0.5 part |

The topcoat is sprayed over the primer to give a total thickness of 2 mils (dry) and then baked at 400° C. for 15 minutes.

The resulting coating of polytetrafluoroethylene adheres well to the aluminum substrate.

EXAMPLE 2

A primer composition may be prepared by thoroughly mixing:

| | |
|---|---|
| Ethyl silicate (available as Union Carbide's ethyl silicate 40, a partially hydrolyzed ethyl silicate containing predominantly pentamers of the silicate), in a mixture of isopropanol and cellosolve (62% solids) | 100 parts |
| Polytetrafluoroethylene organosol, methyl isobutyl ketone, 48% solids | 560 parts |
| Pigment (such as titanium dioxide or atomized aluminum) | 180 parts |

An aluminum sheet is cleaned. The sheet is then sprayed with the primer composition to a thickness of 0.2 to 0.4 mil (dry).

The sheet is then baked for 20 minutes at 200° C. after which it is topcoated with an aqueous dispersion of polytetrafluoroethylene having the following composition:

| | |
|---|---|
| Polytetrafluoroethylene aqueous dispersion (50% solids) | 99.5 parts |
| Sodium salt of the sulfuric acid ester of a mixture of long chain alcohol (predominantly lauryl alcohol) | 0.5 part |

The topcoat is sprayed over the primer to a total thickness of 2 mils (dry) and then baked at 400° C. for 15 minutes.

The resulting coating of polytetrafluoroethylene adheres well to the aluminum substrate.

The invention claimed is:
1. A composition comprising:
   a. from 30 percent through 90 percent by weight of a particulate fluorocarbon polymer, said fluorocarbon polymer being wholly substituted with fluorine atoms or a combination of fluorine and chlorine atoms,
   b. from 10 percent through 70 percent by weight of an alkyl silicate, having up to five carbon atoms per alkyl group, the percentages by weight being based on the combined weight of the solids of said fluorocarbon polymer and said alkyl silicate; and
   c. from 30 percent through 70 percent by weight of a liquid carrier selected from the group consisting of water and mixtures of isopropanol, cellosolve and methylisobutyl ketone.

2. The composition of claim 1 wherein the fluorocarbon polymer is polytetrafluoroethylene.

3. The composition of claim 1 wherein the alkyl silicated is ethyl orthosilicate.

4. An article bearing a fused film of the composition of claim 1.

5. An article bearing a fused film of the composition of claim 2.

6. An article bearing a fused film of the composition of claim 3.

* * * * *